United States Patent [19]

Schleicher et al.

[11] Patent Number: 4,773,692
[45] Date of Patent: Sep. 27, 1988

[54] DEVICE FOR GUIDING OF AIR FLOW ON VEHICLES

[75] Inventors: Bernd Schleicher, Munich; Klaus Meiler, Tutzing; Udo Hausrath, Hadorf; Karl Scheidl, Munich; Martin Specht, Feldafing; Manfred Koeb, Munich; Martin Diez, Bernau, all of Fed. Rep. of Germany

[73] Assignee: Webasto-Werk W. Baier GmbH & Co., Gauting, Fed. Rep. of Germany

[21] Appl. No.: 37,883

[22] Filed: Apr. 13, 1987

[30] Foreign Application Priority Data

Apr. 19, 1986 [DE] Fed. Rep. of Germany ....... 3613319

[51] Int. Cl.$^4$ .............................................. B62D 35/00
[52] U.S. Cl. ......................................... 296/12; 296/91
[58] Field of Search .................... 296/1 S, 217, 223, 91

[56] References Cited

U.S. PATENT DOCUMENTS

| | | | |
|---|---|---|---|
| 3,156,175 | 11/1964 | Werner | 296/217 |
| 4,174,863 | 11/1979 | Gotz | 296/1 S |
| 4,272,125 | 6/1981 | Bienert et al. | 296/223 |
| 4,563,036 | 1/1986 | Bauer | 296/223 X |
| 4,626,025 | 12/1986 | Haecker | 296/223 X |
| 4,660,879 | 4/1987 | Kobayashi et al. | 296/1 S |

FOREIGN PATENT DOCUMENTS

| | | |
|---|---|---|
| 0153743 | 9/1985 | European Pat. Off. . |
| 2300583 | 7/1974 | Fed. Rep. of Germany . |
| 2649953 | 5/1978 | Fed. Rep. of Germany . |
| 2851639 | 6/1980 | Fed. Rep. of Germany . |
| 3019150 | 11/1981 | Fed. Rep. of Germany ...... 296/1 S |
| 2806917 | 4/1983 | Fed. Rep. of Germany . |
| 3520971 | 9/1986 | Fed. Rep. of Germany ...... 296/1 S |
| 92993 | 5/1985 | Japan . |

Primary Examiner—Dennis H. Pedder
Attorney, Agent, or Firm—Sixbey, Friedman, Leedom & Ferguson

[57] ABSTRACT

Device for guiding of air flow on vehicles, especially rear spoilers, with an air deflector which, in relation to the vehicle body, can be moved between a retracted position and an extended position in which the air deflector, as a whole, is away from the vehicle body and, in relation to its orientation in retracted position, is inclined. The air deflector is supported by an arcuate adjuster that is rigidly connected to it and which is slidably guided in a correspondingly arcuate guide channel of a guide block that is fixed with reference to the vehicle body.

24 Claims, 6 Drawing Sheets

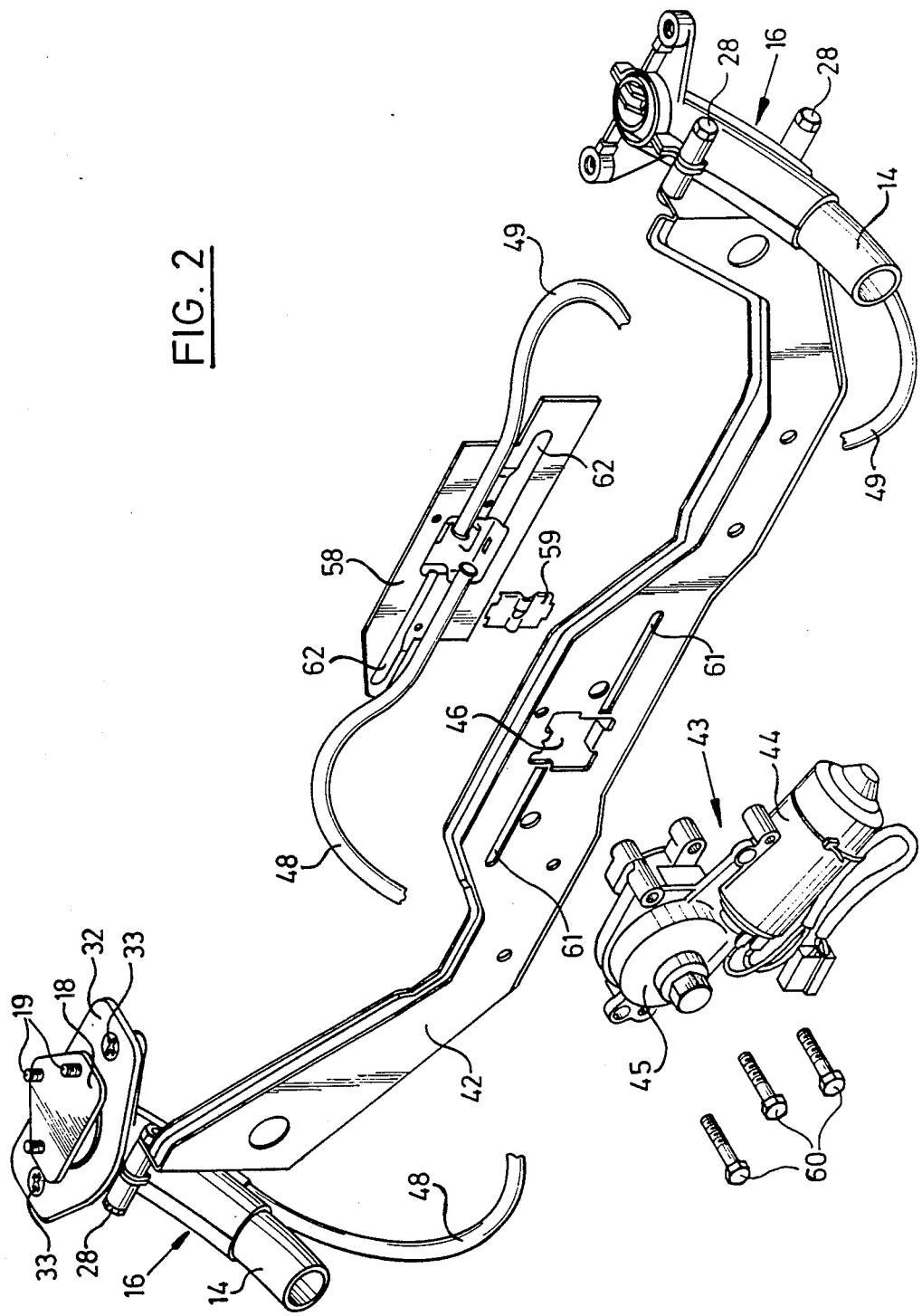

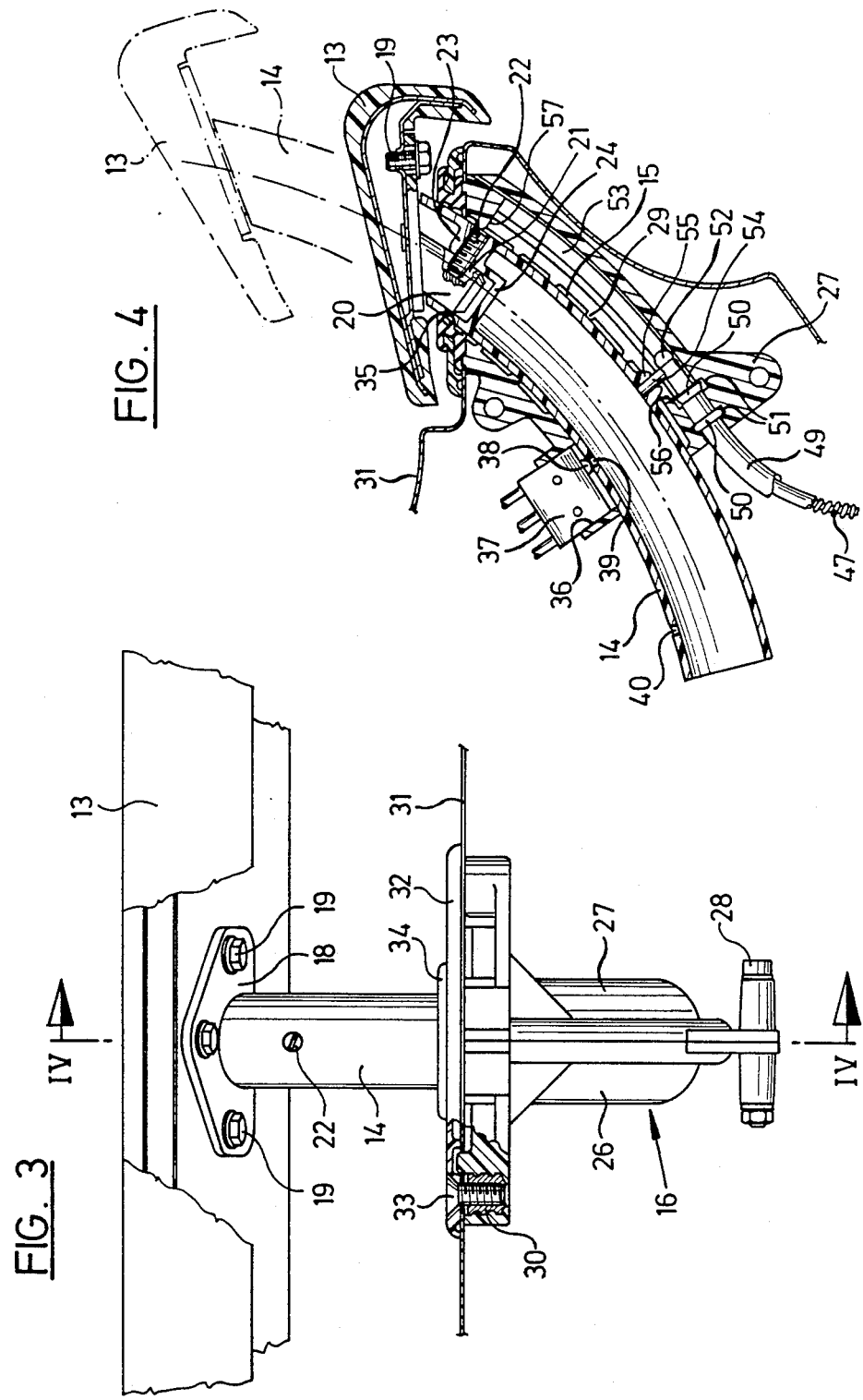

DEVICE FOR GUIDING OF AIR FLOW ON VEHICLES

BACKGROUND AND SUMMARY OF THE INVENTION

The invention relates to a device for guiding of air flow on vehicles, especially rear spoilers, with an air deflector which, in relation to the vehicle body, can be adjusted between a retracted position and an extended position, in which the air deflector, as a whole, is away from the vehicle body and, in relation to its orientation in retracted position, is inclined.

In a known device of this kind (FIG. 4 of German Offenlegungsschrift No. 28 51 639) the air deflector is supported by toggle joint arrangements, which are hinged in the area of the front end and in the area of the back end of the air deflector and which, optionally, can be folded out or in by drive means not explained more in detail there. The known device has many parts and is provided with at least six joints. An additional complication is that the adjustment movement of the toggle joint arrangement acting on the front end of the air deflector must be synchronized with the adjustment movement of the toggle joint arrangement working with the back end of the air deflector. The known device is expensive and vulnerable to failures. Moreover, because of the many joints there can be considerable bearing play.

Known devices (FIG. 3 of German Offenlegungsshrift No. 28 51 639, German Offenlegungsschrift No. 23 00 583, published European Application No. 0 153 743 and laid-open Japanese Application No. 60-92993) have a sturdier design, in which the adjustable air deflector is pivotally mounted, in a hinge-like manner, on the vehicle body or it can be displaced, by parallel guides, parallel to its initial position (DE-OS No. 26 49 953). But such a hinge-like pivoting or parallel adjustment frequently excludes, especially in the case of rear spoilers, an aerodynamically favorable position of the extended air deflector. Consequently, the effectiveness of the air deflector leaves much to be desired.

Thus, a primary object of the present invention is to provide a device with an adjustable air deflector, which is aerodynamically more favorable than devices with an air deflector that is displaceable by pivoting or parallel shifting on the vehicle body, but which, just the same, can be inexpensively produced with only a few moving parts, and which results in a favorable distribution of the acting forces and moments.

This object is achieved according to preferred embodiments of the invention in that the air deflector is supported by at least a curved adjuster that is rigidly connected to it, the adjuster being slidably guided in a correspondingly curved guide channel of a guide block that is fixed in relation to the vehicle body.

The invention is based on recognition of the fact that a passage of the air deflector from the retracted position into a desired fluidically favorable extended position can be achieved by an arcuate movement of the air deflector around an (imaginary) center of rotation based upon the two end positions of the air deflector, a center of rotation which corresponds to the center of curvature of the guide channel and of the adjuster and which, in the solution according to the invention, can be placed at any spot determined by the fluidic conditions. The device according to the invention requires only a few moving parts, so that, in a particularly simple way, a defined adjustment movement is provided for wherein bearing play can easily be kept small, and the force and moment distributions are favorable.

It is indeed known (German Patent No. 28 06 917) to provide an arcuate adjuster in the case of an adjustment device for a vent window of a vehicle, an adjuster which is slidably guided in a correspondingly arcuate guide channel of a guide block fastened to the vehicle body. But in this case, the vent window, on the end away from the adjuster, is connected to the vehicle body by hinges, which determine the swivel axis for the window, and the adjuster is hinged on the vent window.

The adjuster of the present invention can suitably be driven by an incompressible drive cable which, over at least a part of its length, can be laid in a guide pipe. In this case, advantageously, the end of the drive cable which is in driving connection with the adjuster can be slidably guided in an arcuate track formed in the guide block, whose center of curvature coincides with the center of curvature of the adjuster and of the guide channel. The sliding movement between the adjuster and the guide block takes place in an especially smooth way if the guide channel is defined by a series of flange-like webs within the guide block. Consequently, the friction between the guide block and adjuster is kept small. In a way that is particularly advantageous from a manufacturing and assembling engineering standpoint, the guide block can be formed by two half shells. The adjuster can be designed to be tubular. As a result, a very stable design of comparatively light weight can be achieved.

An annular seal is suitably placed at the location where the adjuster emerges from the guide block toward the air deflector, a seal which prevents the penetration of rain or wash water into the guide channel. In this connection, a particularly effective sealing is achieved if the opening of the annular seal, through which the adjuster axially extends, basically forms a continuation of the arcuate guide channel.

In accordance with another aspect of the invention, the air deflector is connected to a plate carried by the adjuster via screws. The plate is applied to the underside of the air deflector, and carries an extension which projects away from the air deflector into a facing end of the adjuster and is held there by means of a set screw. The set screw is screwed into the adjuster at a spot that is hidden within the guide channel when the air deflector is retracted. As a result, when the air deflector is retracted, its fastening elements are inaccessible. Theft of the air deflector is, therefore, effectively prevented. Preferably, in this case, the outer end of the screwed-in set screw is flush or almost flush with the outer surface of the adjuster. In this way, an unintentional loosening of the set screw is immediately recognizable by the fact that the air guide profile can no longer be brought into the retracted position. This contributes to increased security.

A threaded cable can be provided as a drive cable which meshes with a drive pinion of a drive unit. But in the interest of an increased continuous loadibility, the drive cable is preferably designed as wire rope, whose end away from the adjuster is connected to a rack which, on its part, meshes with the drive pinion of the drive unit. The drive unit can suitably comprise an electric motor which drives the drive pinion by a reduction gear set placed in a gear housing. When a drive cable in the form of a wire rope with an attached rack is used, this rack advantageously is slidably guided in a guide channel of the gear housing and the rack, together with the gear housing, can form stops for limiting the range of movement of the air deflector, as a result of which the transmission of the impact forces to the drive cable is avoided. Instead of or in addition to such stops, mutually engageable stops can be provided on the adjuster and the guide block, in which case they would also prevent an unintentional withdrawal of the adjuster from the guide block.

Suitably, at least one limit switch, for producing a signal as a function of the adjustment movement of the air deflector, is provided which indicates whether the air deflector is in one of its end positions i.e., the retracted or extended position, or is in an inbetween position. By means of such a signal, in particular, the drive motor can be cut off. The limit switch can be mounted on the guide block and have a contact feeler projecting into the guide channel for the adjuster, while the adjuster, in the area facing the feeler, is provided with indentations or recesses into which the feeler can fall at spots which correspond to the end positions of the air deflector. But preferably, at least one limit switch is placed in a protected position within the gear housing and has contact feeler which projects into the guide channel for the rack and falls into a recess of the rack in the positions of the rack corresponding to the end positions of the air deflector.

In the interest of increased stability, the air deflector is preferably supported on at least two parallel adjusters which, in each case, are guided in their own guide block. The guide blocks in this case are advantageously fastened to a common base plate. Preferably, a drive unit serving for the common driving of the two adjusters is provided, which can also be fastened to the base plate. To be able to adjust the air deflector, even in the case of a failure of the drive motor, for example, because of a lack of on-board voltage, it is preferable to provide an emergency device for adjustment of the air deflector by hand after uncoupling of the electric motor and the reduction gear set. In this connection, a particularly simple and sturdy arrangement is obtained if the reduction gear set has a manually rotatable and axially shiftable drive shaft which is always in driving connection with the drive pinion for the drive cable but which, by axial sliding, can selectively be engaged or disengaged with the output side of the reduction gear set.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is an exploded perspective representation of the adjustable rear spoiler according to FIG. 1, but with the air deflector removed;

FIG. 3 is a partially broken away and partially sectioned view of the device according to FIG. 1, viewed from behind, in the area of a single adjuster that is shown in an extended position of the air deflector;

FIG. 4 is a sectional view taken along line IV—IV of FIG. 3, in which the air deflector is illustrated with solid lines in a retracted position and diagrammatically illustrated with dot-dash lines in an extended position;

DETAILED DESCRIPTION OF THE PREFERRED EMBODIMENTS

Figure 1:
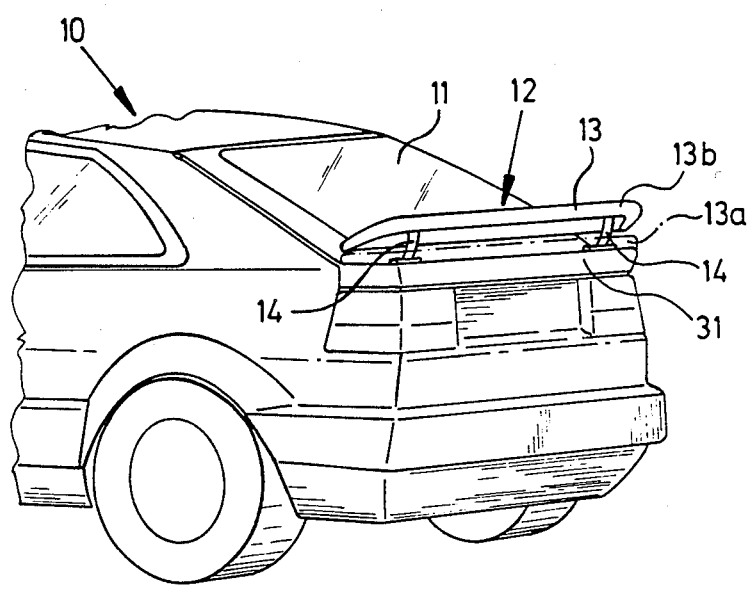
FIG. 1 is a perspective view of a rear portion of a motor vehicle which is equipped a device serving as a rear spoiler according to the invention.

Motor vehicle 10, represented in FIG. 1, has a rear spoiler designated generally by reference numeral 12, which sits near the lower end of rear window 11. Rear spoiler 12 is provided with an air deflector 13 which, close to its two lateral ends, is supported by two adjusters 14. Adjusters 14 and the respective guiding and driving parts thereof are essentially identical. By means of adjusters 14, air deflector 13 can be raised and lowered between an extended position, shown by solid lines at 13b, and a retracted position, as indicated by dot-dash lines at 13a in FIG. 1.

As can be seen in FIGS. 2 and 4, each of adjusters 14 is arcuately curved and is slidably guided in a correspondingly curved guide channel 15 of a guide block 16. The radii of curvature of adjuster 14 and guide channel 15 match. The center of the curvature provides the center of rotation around which air deflector 13 performs a defined arcuate movement between the retracted position and extended position. The center of rotation is based upon the desired end positions of air deflector 13.

Each of the two tubular adjusters 14 is connected to air deflector 13 by an attachment plate 18 which rests against the underside of air deflector 13 and is held there by threaded bolts 19. Plate 18 carries a downwardly projecting extension 20, which basically has a semicircular cross section and is provided with a longitudinal groove 21 (FIG. 4). Extension 20 projects into the top end of adjuster 14 which faces toward air guide profile 13 and is held there by a set screw 22. Set screw 22 is screwed into a tapped eye 23 on the inside of adjuster 14. The inside end of set screw 22 projects into longitudinal groove 21 and rests against the bottom of this groove. The outside end of set screw 22 is flush or almost flush with the outside surface of adjuster 14 at a point of the adjuster which, when the air deflector 13 is retracted, is hidden within guide channel 15, as represented in FIG. with solid lines. If air deflector 13 is retracted, neither bolts 19 nor set screw 22 is accessible, as can be seen in FIG. 4. The bolts are not only protected from the affects of weather, but they also cannot be loosened without authorization when the vehicle is parked with the rear spoiler retracted. In addition, an unintentional loosening of set screw 22 is immediately recognizable because the outside end of this screw will then project beyond the peripheral surface of adjuster 14, thereby preventing adjuster 14 from being completely retracted into guide block 16 due to engagement of set screw 22 upon guide block 16. The top end of tubular adjuster 14 is closed by a recessed wall 24 which prevents water or dirt from getting into the inside of the car through adjuster 14.

Guide block 16 consists basically of two mirror image half shells 26 and 27, which are connectedto one another by bolts 28. Half shells 26, 27 carry flange-like webs 29 on inside surfaces defining guide channel 15. As a result, the friction surface between adjuster 14 and guide block 16 is reduced. A threaded bush 30 is molded into each of the half shells 26, 27 and preferably consists of plastic. In the embodiment illustrated, guide block 16 is fastened from below against a suitable body part, for example, trunk hood or tailgate 31 of vehicle 10 in FIG. 1, while a fastening plate 32 is applied from the outside. Screws 33, which engage in threaded bushes 30, connect fastening plate 32 to guide block 16. In this connection, the body sheet, for example of body part 31, is clamped between guide block 16 and fastening plate 32. An annular seal 34, clipped to fastening plate 32, is placed on the end of guide 16 facing toward air deflector 13. Opening 35 of annular seal 34, through which adjuster 14 passes, is basically designed as an axial continuation of arcuate guide channel 15 of circular cross section.

Half shells 26, 27 are provided with a recess 36 for a limit switch 37. A contact feeler 38 of switch 37 projects toward guide channel 15. Indentations or recesses 39, 40 are formed in the adjuster in an area of adjuster that is traversed by the feeler 38 during extension and retraction of deflector 13. If adjuster 14 reaches either end position, feeler 38 falls into recess 39 or 40, as a result of which an electric signal is produced, which represents detection of the fact that air guide profile 13 occupies a respective end position of its extension/retraction movements. If air deflector 13 is in an in-between position, feeler 38 is pressed upward from its position shown in FIG. 4.

The two guide blocks 16, by the bolts that connect half shells 26, 27 to one another, are fastened at opposite ends of a common base plate 42 (FIG. 2). Further, base plate 42 carries, in its central area, a drive unit 43. Drive unit 43 is a common drive for both of the two adjusters 14, and, in the embodiment illustrated, comprises a reversible electric motor 44 and a reduction gear set 45 attached as a unit with it. The drive shaft of reduction gear set 45 carries a drive pinion (similar to pinion 97 shown with reference to a modified embodiment in FIGS. 5 and 6) which, similar to a sliding roof drive (see, for example, U.S. Pat. No. 4,272,125), in the area of a cutout 46 of base plate 42 is in meshing engagement with two incompressible threaded drive cables 47, only one of which is partially shown in FIG. 4. Drive cables 47, in each case, are laid in a guide pipe 48 or 49, which extends from the drive pinion of drive unit 43 to the respective guide block 16. Guide pipes 48, 49, on their guide block end, are provided with radially projecting flanges 50, which are inserted in grooves 51 of half shells 26, 27 (FIG. 4). The ends 52 of drive cables 47 opposite drive unit 43 are slidably guided in a circular guide track 53 formed in a respective guide block 16. The center of curvature of track 53 coincides with the center of curvature of adjuster 14 and guide channel 15. Drive cable end 52 is connected to adjuster 14 by a drive pin 54. Drive pin 54 is inserted into an outwardly projecting eye 55 of adjuster 14 which, in the end positions of air deflector 13, strikes stop 56 or 57 of half shells 26, 27. As a result, the movement of adjuster 14 relative to guide block 16 is limited.

The ends of guide pipe 48, 49 directed toward drive unit 43 and a guide plate 59 are fastened between base plate 42 and a holding plate 58. To accommodate the guide pipes 48, 49, base plate 42 and holding plate 58 are provided with appropriate stampings 61, 62 for this purpose and form guides for the driven ends of drive cables 47, which extend out from pipes 48, 49 to engage drive unit 43. Holding plate 58 is held on base plate 42 by bolts 60, these bolts 60 serving, at the same time, for fastening of drive unit 43 to base plate 42. When electric motor 44 is switched on, drive cables 47 are jointly displaced within pipes 48, 49 and via drive pin 54, cause adjusters 14 to be moved in guide channel 15 of the respective guide block 16, so that the air deflector 13, which is fastened to adjusters 14, is extended or retracted. When the respective end position is reached, spring-biased feeler 38 of limit switch 37 falls into recess 39 or 40 and, on the basis of the signal thus delivered by limit switch 37, electric motor 44 is stopped.

The device that has been explained can be designed as a compact, preassembled unit. Installation in vehicle 10 consequently requires only few manipulations.

Figure 5:
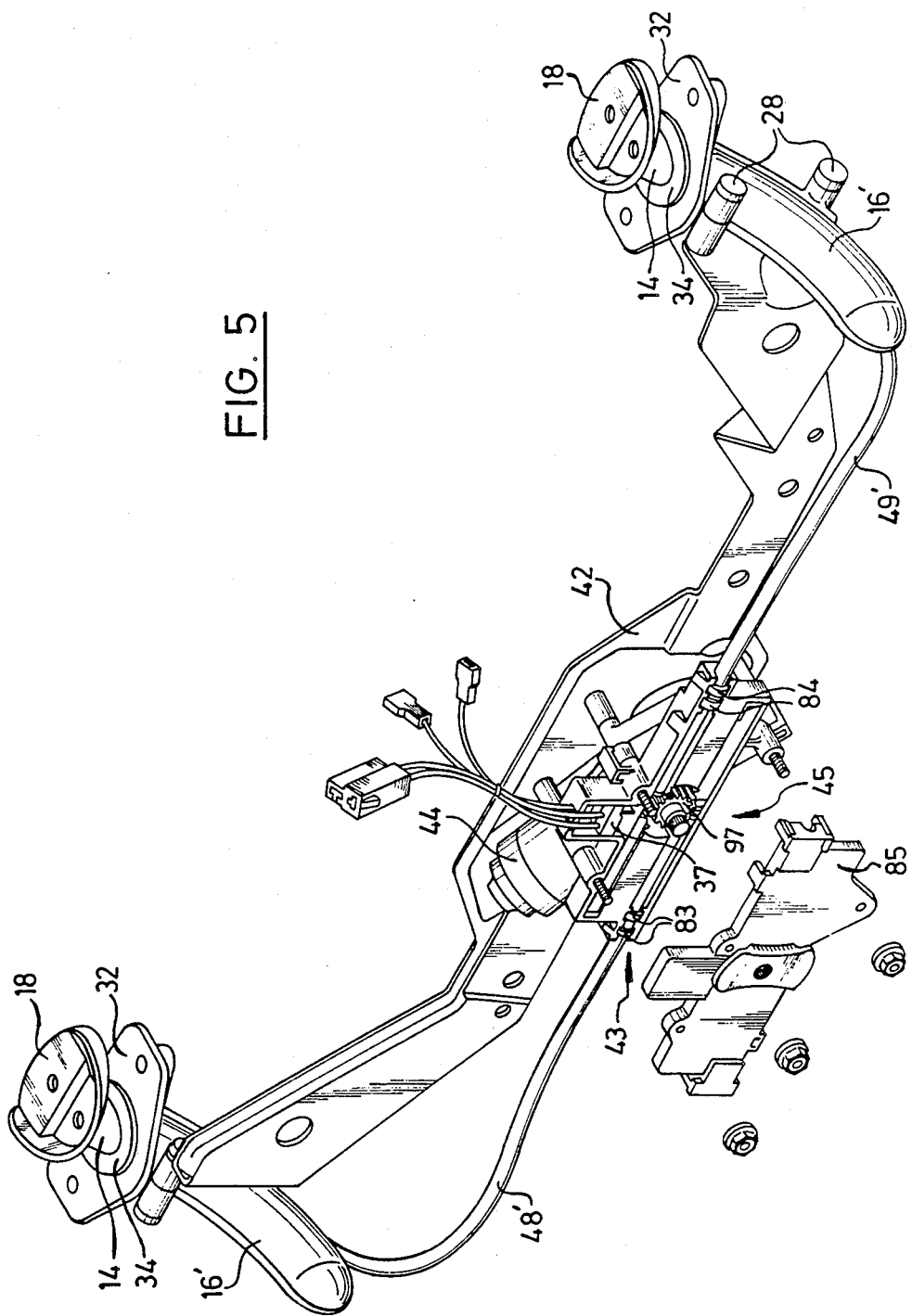
FIG. 5 is a perspective representation of a modified embodiment of the device according to the invention with the air deflector omitted.
Figure 6:
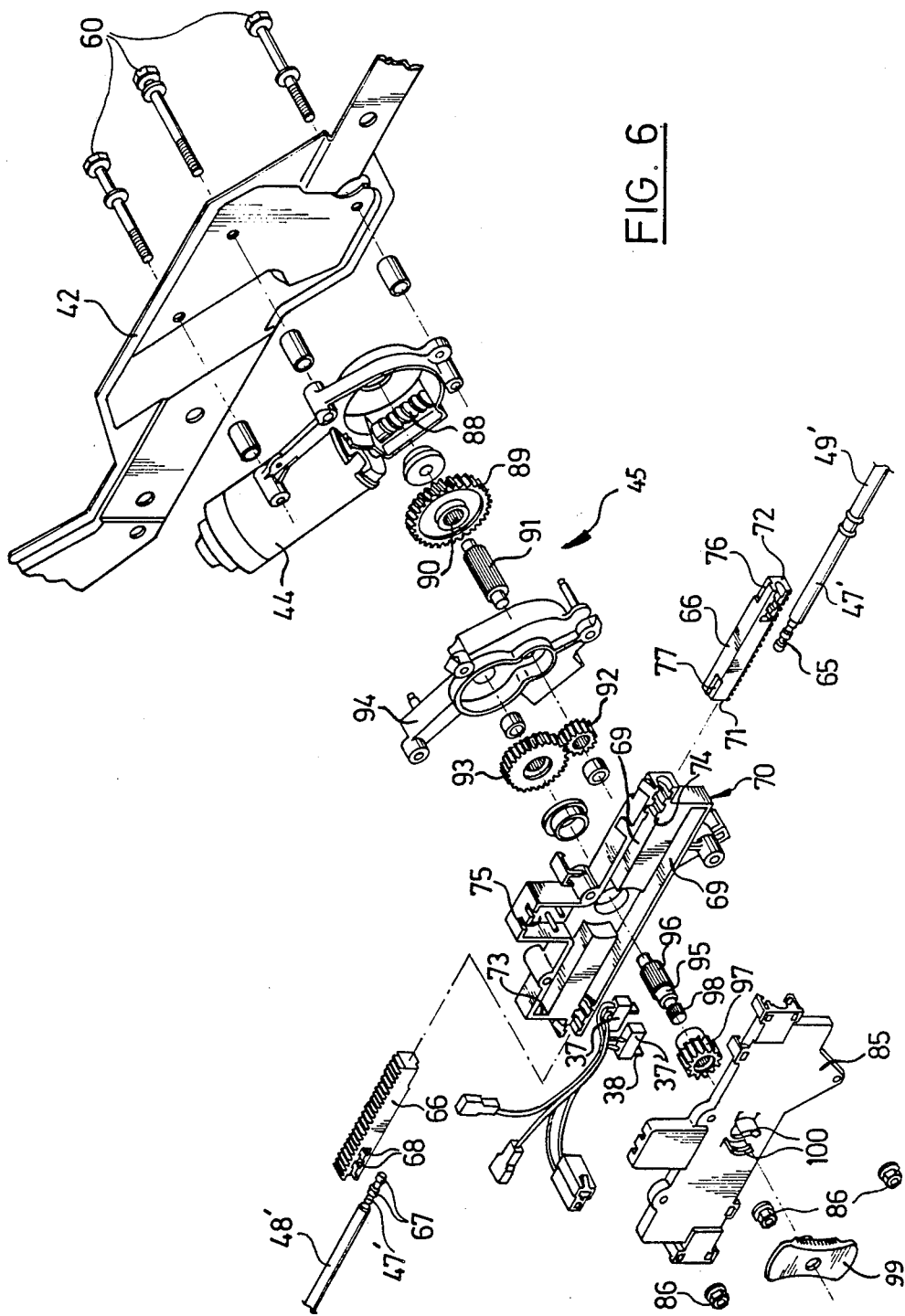
FIGS. 6 and 7 are exploded perspective partial representations of the drive and adjuster portions, respectively, of the device according to FIG. 5.
Figure 7:
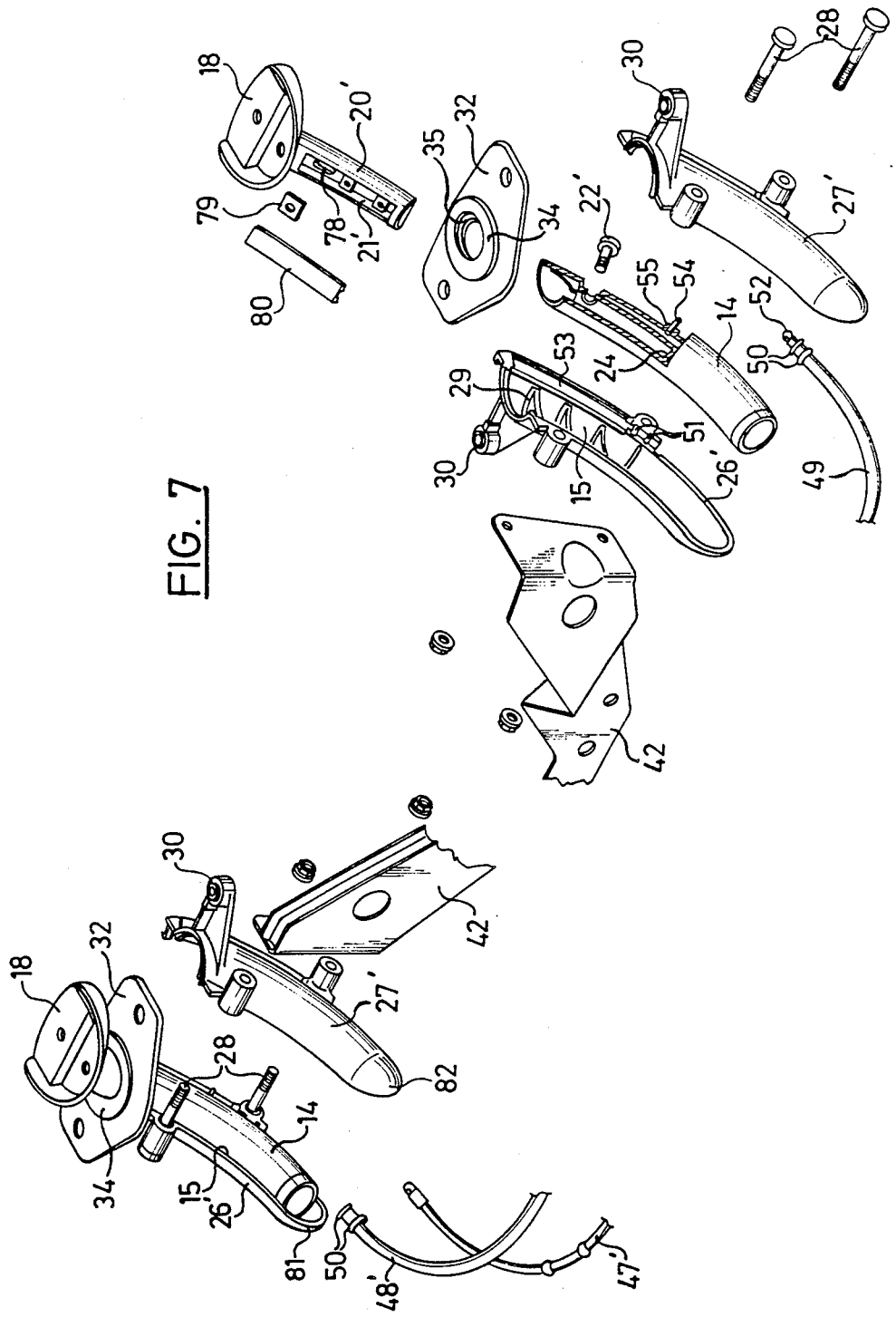

The modified embodiment illustrated in FIGS. 5 to 7, for the most part, corresponds to the arrangement according to FIGS. 1 to 4. Thus, the same reference numerals have been used for components common to both embodiments, consequently, and only elements or aspects of the embodiment of FIGS. 5–7 that deviate from the embodiment according to FIGS. 1 to 4 are explained in detail and distinguished by different reference numerals or primes (').

While in the case of the above-described embodiment drive cable 47 is designed as threaded cable, the embodiment according to FIGS. 5 to 7 is provided with drive cables 47' that are in the form of wire ropes, the driven ends 65 of which are connected to a respective rack 66 (FIG. 6). For coupling of drive cables 47' to racks 66, the ends 65 of the drive cables 47' have annular, radially projecting segments 67 which are inserted into corresponding recesses 68 of racks 66. Racks 66, in each case, are guided in a longitudinally movable manner in a guide channel 69 of a gear housing 70 that receives reduction gear set 45. The longitudinal ends 71, 72 of racks 66 together with end walls 73, 74 of guide channels 69 form stops for limiting the extent to which air deflector 13 may be moved, and by forming these stops in the gear housing, the impact forces are not transferred to drive cable 47' and the adjuster mechanism of air deflector 13.

In a departure from the embodiment according to FIGS. 1 to 4, two limit switches 37, 37' are provided for improved protection from environmental influences, especially dust and water, in gear housing 70, instead of in the mounting block as in the embodiment of FIGS. 1-4. Limit switches 37, 37', in this case, sit in a housing chamber 75 with the contact feeler 38 projecting into the upper one of the two parallel guide channels 69 (FIG. 6). The contact feeler 38 of limit switch 37 will extend into a recess 76 at end 72 of the respective rack 66, if air deflector 13 is in its retracted position. On the other hand, if air deflector 13 reaches its fully extended position, the contact feeler 38 of limit switch 37' will fall into a recess 77 at the opposite end 71 of the respective rack 66. In the in-between positions of air deflector 13, feelers 38 of the two limit switches 37 and 37' are pressed upward by rack 66.

Lock bolt 22', corresponding in function to set screw 22, engages through a slotted hole 78 (FIG. 7) of extension 20' and is screwed into a nut 79, which is guided and locked in longitudinal groove 21' of extension 20'. In this way, the insertion depth of extension 20' in the respective adjuster 14 can be adjusted. Longitudinal groove 21' is covered by means of a cover strip 80.

Half shells 26', 27' of guide block 16' have closed ends 81 or 82 opposite fastening plate 32, thus covering the bottom end of the respective guide channel 15. As a result, in an advantageous and simple way, the penetration of dust into guide channels 15 at the lower end thereof is prevented.

In the case of the embodiment according to FIGS. 5 to 7, holding plate 58 and guide plate 59 are eliminated. The guide pipes 48', 49', at their ends nearest the drive unit 43, are fastened in gear housing 70, radially projecting flanges 83 of guide pipes 48', 49' engaging in corresponding recesses 84 of gear housing 70 and/or housing cover 85 (FIG. 5). Electric motor 44, gear housing 70 and housing cover 85 are connected to base plate 42 by bolts 60. Nuts 86 are screwed on bolts 60.

Details of drive unit 43 are illustrated in FIG. 6. As shown, electric motor 44 has a worm gear shaft 88, which engages with a gear wheel 89. Gear wheel 89 forms a splined connection with splines 90 of splined intermediate shaft 91 so that rotation of gear wheel 89 rotates shaft 91. Further, intermediate shaft 91 is connected to a splined spur wheel 92, which, itself, meshes with alarger spur wheel 93. A splined shaft 95 is mounted to slide, in an axially limited way, in gear housing 70 and a housing part 94 of reduction gear set 45. Spur wheel 93 is connected for rotation with shaft 95 by splines 96, if shaft 95 is in its normal position, in which it is shoved to the right in FIG. 6. A drive pinion 97, that is always engaged with racks 66, is connected to shaft 95 by splines 96 so as to be rotatable by and axially slidable relative to shaft 95. A serrated end 98 of shaft 95 projects through housing cover 85 (left end in FIG. 6). Shaft 95 is connected by serrated end 98 to an emergency handle 99 so as to be both rotatably and slidably displaceable by the emergency handle 99.

In the normal position of shaft 95, snap catches 100, on housing cover 85, are behind an annular ring (not shown in FIG. 6) of handle 99. In this position shaft 95 is engaged with spur wheel 93. Torque from motor 44 is transmitted by reduction gear set 45 to drive pinion 97 and racks 66. For a manual emergency operation, for example, in the case of failure of the on-board voltage, handle 99 and, with it, shaft 95 are pulled to the left (relative to FIG. 6), whereby snap catches 100 release handle 99 and splines 96 disengage from spur wheel 93. As a result, motor 44 and reduction gear 45 are uncoupled from shaft 95. As a result, air deflector 13 can be raised or lowered by rotation of handle 99.

It should be appreciated that, even though the invention has been described in terms of two separate embodiments, various aspects of one embodiment can be interchanged with corresponding aspects of the other. For example, the embodiment of FIGS. 1-4 could be equipped with closed-end guide blocks 16' and/or a manual, emergency operation, handle as in FIGS. 5-7. Likewise, the embodiment of FIGS. 5-7 may use threaded drive cables 47 or a set screw 22 to secure the adjuster to the mounting plate extension. Therefore, while we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modification as are encompassed by the scope of the appended claims.

We claim:

1. Spoiler device for guiding of air flow on vehicles, comprising an air deflector and means for displacing the air deflector, in relation to a vehicle body, between a retracted position and an extended position, the entire air deflector in said extended position being displaced away from the vehicle body and inclined relative to its orientation in said retracted position, wherein said means for displacing the air deflector comprises at least one arcuate adjuster to which the air deflector is rigidly connected, said adjuster being slidably guided in a corresponding arcuate guide channel of a guide block, said guide block having means for positional fixing thereof on a vehicle body; wherein the displacement of said air deflector between said retracted and extended positions is an arcuate movement about an imaginary center of rotation which corresponds to a center of curvature of said arcuate guide channel.

2. Device according to claim 1, wherein said adjuster is in driven connection with an incompressible drive cable.

3. Device according to claim 2, wherein said drive cable, over at least a part of its length, is laid in a guide pipe.

4. Device according to claim 2, wherein a first end of said drive cable is drivably connected with said adjuster and is slidably guided in an arcuate track formed in the guide block, a center of curvature of said acruate track coinciding with the guide channel.

5. Device according to claim 4, wherein said drive cable is a wire rope, said first end of which is connected to the adjuster, and a second, opposite end of which is connected to a rack, said rack meshing with a drive pinion of a drive unit.

6. Device according to claim 1, wherein said guide channel is defined by flange-like webs within the guide block for reducing frictional contact with the adjuster.

7. Device according to claim 1, wherein the guide block is formed by two half shells.

8. Device according to claim 1, wherein an annular seal is placed at an end of the guide block that faces toward said air deflector at a location at which the adjuster emerges from the guide channel.

9. Device according to claim 8, wherein an opening of said annular seal, through which said adjuster passes, forms an axial continuation of the arcuate guide channel.

10. Device according to claim 1, wherein the adjuster is tubular.

11. Device according to claim 1, wherein said air deflector is connected to said adjuster by an attachment plate that is fixed to an underside of the air deflector, said attachment plate having an extension which projects into an end of the adjuster that faces toward the air deflector and wherein means for fixing the extension to the adjuster is screwed into the adjuster at a spot that is hidden within the guide channel when the air deflector is in its retracted position.

12. Device according to claim 11, wherein the means for fixing is a set screw, an outside end of which is approximately flush with a peripheral surface of the adjuster.

13. Device according to claim 2, wherein a drive unit, comprising an electric motor and a drive pinion driven by the electric motor via a reduction gear set, is attached to a gear housing in driving connection with the drive cable.

14. Device according to claim 5, wherein said drive unit comprising an electric motor that is connected to said drive pinion via a reduction gear set, said rack being slidably guided in a guide channel of a gear housing.

15. Device according to claim 14, wherein said rack together with the gear housing forms stops for limiting the movement of the air deflector.

16. Device according to claim 1, wherein at least one limit switch for producing a signal as a function of the position of the air deflector is provided as a means for indicating whether the air deflector is in either of the retracted and extended positions or is, instead, in an in-between position.

17. Device according to claim 14, wherein at least one limit switch for producing a signal as a function of the position of the air deflector is provided as a means for indicating whether the air deflector is in either of the retracted and extended positions or is, instead, in an in-between position.

18. Device according to claim 17, wherein said at least one limit switch is placed in said gear housing and has a contact feeler projecting into a guide channel for the rack at a position where it will fall into a recess of the rack in positions of rack corresponding to the retracted and extended positions of air deflector.

19. Device according to claim 1, wherein the air deflector is supported on at least two parallel adjusters, each adjuster being guided in a respective said guide block.

20. Device according to claim 19, wherein the guide blocks for the two adjusters are fastened to a common base plate.

21. Device according to claim 20, wherein a drive unit is provided for the common driving of the two adjusters.

22. Device according to claim 21, wherein the drive unit is also fastened to said base plate.

23. Device according to claim 13, wherein an emergency device is provided for adjustment of the air deflector by hand, said emergency device acting to uncouple the electric motor and reduction gear set from the drive pinion and being operable to drive the drive cable via said drive pinion.

24. Device according to claim 23, wherein said emergency device includes a manually rotatable and axially slidable drive shaft of the reduction gear set which is always in driving engagement with said drive pinion and which can be selectively engaged with and disengaged from an output side of the reduction gear set by axial movement thereof.

* * * * *